(12) United States Patent
Baird et al.

(10) Patent No.: US 10,703,977 B2
(45) Date of Patent: Jul. 7, 2020

(54) PROCESSES FOR REDUCING THE ENERGY CONSUMPTION OF A CATALYTIC CRACKING PROCESS

(71) Applicant: UOP LLC, Des Plaines, IL (US)

(72) Inventors: Lance A. Baird, Prospect Heights, IL (US); Sathit Kulprathipanja, Schaumburg, IL (US); Paolo Palmas, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 740 days.

(21) Appl. No.: 15/285,419

(22) Filed: Oct. 4, 2016

(65) Prior Publication Data

US 2017/0097153 A1    Apr. 6, 2017

Related U.S. Application Data

(60) Provisional application No. 62/237,264, filed on Oct. 5, 2015.

(51) Int. Cl.
| | |
|---|---|
| *C10B 53/02* | (2006.01) |
| *C10L 5/44* | (2006.01) |
| *C10B 49/22* | (2006.01) |
| *F23G 7/10* | (2006.01) |
| *C10G 11/18* | (2006.01) |
| *C10L 5/42* | (2006.01) |

(52) U.S. Cl.
CPC .............. *C10B 53/02* (2013.01); *C10B 49/22* (2013.01); *C10G 11/18* (2013.01); *C10L 5/42* (2013.01); *C10L 5/447* (2013.01); *F23G 7/10* (2013.01); *C10L 2200/0469* (2013.01); *C10L 2290/02* (2013.01); *C10L 2290/06* (2013.01); *C10L 2290/10* (2013.01); *C10L 2290/143* (2013.01); *C10L 2290/547* (2013.01); *F23G 2900/50202* (2013.01); *Y02E 50/14* (2013.01); *Y02E 50/30* (2013.01)

(58) Field of Classification Search
CPC .... C10G 2300/1011; C10G 1/02; C10G 3/42; C10G 11/00; C10G 2300/708; C10G 3/50; C10G 3/60; C10G 45/02; C10G 65/043; C10G 21/00; C10G 21/28; C10L 2200/0469; C10L 2290/02; C10L 2290/06; C10L 2290/10; C10L 2290/143; C10L 2290/547; C10L 5/42; C10L 5/447

See application file for complete search history.

(56) References Cited

U.S. PATENT DOCUMENTS

| | | | |
|---|---|---|---|
| 7,241,323 B2 * | 7/2007 | Serio ....................... | C10B 53/00 422/164 |
| 8,895,790 B2 | 11/2014 | Narayanaswamy et al. | |
| 8,927,794 B2 | 1/2015 | Boon et al. | |
| 2012/0214113 A1 | 8/2012 | Kulprathipanja et al. | |
| 2014/0336427 A1 * | 11/2014 | Baird ..................... | C10G 21/28 585/240 |
| 2015/0065760 A1 | 3/2015 | Freel et al. | |

OTHER PUBLICATIONS

Al-Sabawi et al., "Fluid catalytic cracking of biomass-derived oils and their blends with petroleum feedstocks: A review", Energy and Fuels (2012), v 96, n 9, p. 5335-5372.

Liu, "Application of UOP's recycle bed catalyst regeneration in FCC revamping", Petroleum Refinery Engineering (2000), v 30, n 9, p. 9-11.

Kuang et al., "Revamping for energy saving and operation analysis of a FCC unit", Petroleum Processing and Petrochemicals (2011), v 42, n 9, p. 85-89.

Denny et al., "Gaining an economic advantage from effective utilization of excess FCC capacity" American Petroleum Institute, Refining Department (1985), v 64, p. 230-238.

* cited by examiner

*Primary Examiner* — Sharon Pregler
(74) *Attorney, Agent, or Firm* — Paschall & Associates, LLC; James C. Paschall

(57) ABSTRACT

Processes and apparatuses for co-processing pyrolysis effluent and a hydrocarbon stream in which a char produced by the catalytic cracking of the pyrolysis effluent is recovered and utilized to provide energy, such as heat to the catalytic cracking zone. The char can be burned in various combustion zones associated with the catalytic cracking zone. The char is produced from a renewable resource.

14 Claims, 1 Drawing Sheet

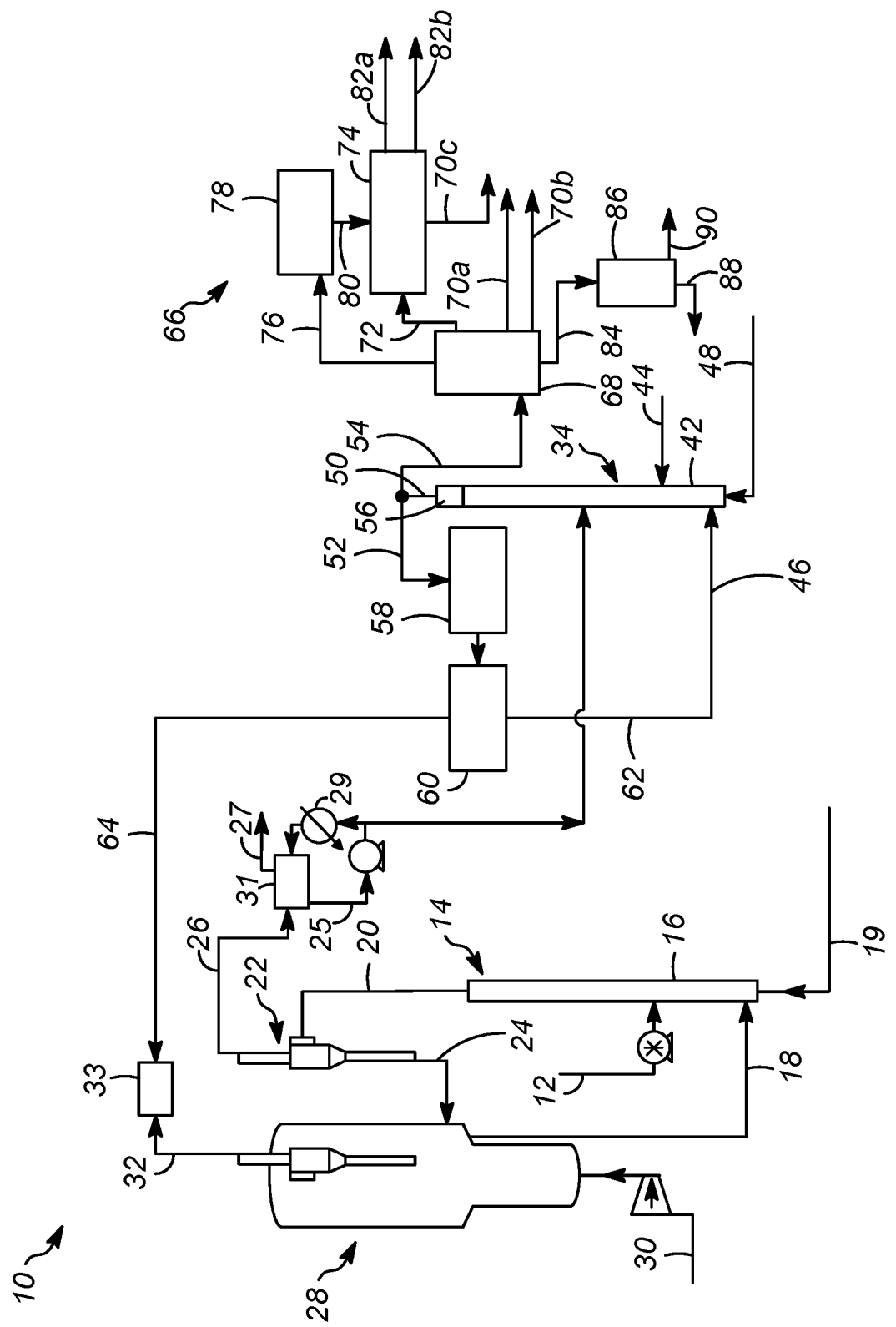

PROCESSES FOR REDUCING THE ENERGY CONSUMPTION OF A CATALYTIC CRACKING PROCESS

CROSS-REFERENCE TO RELATED APPLICATION

This application claims priority from Provisional Application No. 62/237,264 filed Oct. 5, 2015, the contents of which are hereby incorporated by reference.

FIELD OF THE INVENTION

The present invention generally relates to processes for catalytically cracking a mixture of a pyrolysis effluent and a hydrocarbon stream, and more particularly to processes for reducing the energy consumption of same.

BACKGROUND OF THE INVENTION

Fluid catalytic cracking (FCC) is a well-known process for converting relatively high boiling point hydrocarbons to lower boiling point hydrocarbons in the heating oil or gasoline range. Such processes are commonly referred to in the art as "upgrading" processes. To conduct FCC processes, FCC units are generally provided that have one or more reaction zones, in which a hydrocarbon stream is contacted with a particulate cracking catalyst. The particulate cracking catalyst is maintained in a fluidized state under conditions that are suitable for converting the relatively high boiling point hydrocarbons to lower boiling point hydrocarbons.

While hydrocarbon streams such as vacuum gas oil, reduced crude, or other petroleum-based sources of hydrocarbons have commonly been upgraded through FCC processes, there is a general desire to upgrade biofuels along with the hydrocarbon streams in the FCC processes. By upgrading biofuel along with the hydrocarbon streams, the resulting upgraded fuel includes a renewable content and enables net petroleum-based hydrocarbon content of the upgraded fuel to be decreased.

Biofuels encompass various types of combustible fuels that are derived from organic biomass, and one particular type of biofuel is pyrolysis oil, which is also commonly referred to as biomass-derived pyrolysis oil. Pyrolysis oil is produced through pyrolysis, including through recently-developed fast pyrolysis processes. Fast pyrolysis is a process during which organic biomass, such as wood waste, agricultural waste, etc., is rapidly heated to about 450 to about 600° C. (about 842 to about 1112° F.) in the absence of air using a pyrolysis unit. Under these conditions, a pyrolysis vapor stream including organic vapors, water vapor, and pyrolysis gases is produced, along with char (which includes ash and combustible hydrocarbon solids). A portion of the pyrolysis vapor stream is condensed in a condensing system to produce a pyrolysis oil stream. Pyrolysis oil is a complex, highly oxygenated organic liquid that typically contains between about 20 to 30% by weight water with high acidity (TAN>150).

Various examples of processing the pyrolysis effluent and a hydrocarbon stream in a catalytic cracking zone are shown in U.S. Pat. Pub. Nos. 2014/0034550 and 2014/0034552. In as much as these processes require increased temperatures, the processes require a net input of energy.

Accordingly, it would be beneficial to have one or more processes in which the amount of energy needed for these processes is lower. It would further be desirable if such processes lowered the greenhouse gas emissions of the processing units.

SUMMARY OF THE INVENTION

One or more processes and apparatuses have been invented for co-processing pyrolysis product in an FCC processing unit in which the energy consumed by the processes is lowered by recovering and using char. As used herein, "char" refers to the carbonaceous solid matter formed during the catalytic cracking of the pyrolysis product with the hydrocarbon stream. When heated to FCC feed temperatures, pyrolysis product forms char. The char may be recovered from the cracking effluent and utilized to provide heat within the process.

In a first embodiment of the invention, the present invention may be characterized broadly as providing a process for recovering energy in a catalytic cracking zone by: generating char in a catalytic cracking zone, the catalytic cracking zone configured to receive at least a hydrocarbon stream and a pyrolyzed stream and provide a cracked effluent, wherein the cracked effluent includes char; separating the char from hydrocarbons in the cracked effluent to provide a recovered char; and, providing energy to the catalytic cracking zone with the recovered char.

In at least one embodiment of the present invention, the recovered char provides energy to the catalytic cracking zone by heating.

In at least one embodiment of the present invention, the process includes mixing the recovered char with a hydrocarbon liquid to provide a slurry fuel; and, burning the slurry fuel.

In at least one embodiment of the present invention, the process includes drying the recovered char to provide a dried char; and, burning the dried char.

In some embodiments of the present invention, the char is separated from hydrocarbons in the cracked effluent in a char recovery zone. It is contemplated that the char recovery zone includes a filtration zone. It is further contemplated that the filtration zone includes a slurry filter.

In a second aspect of the present invention, the present invention may be generally characterized as providing a process for reducing greenhouse gas emissions in a catalytic cracking zone by: passing a hydrocarbon stream to a catalytic cracking zone; passing a pyrolyzed stream to the catalytic cracking zone; cracking hydrocarbons from the hydrocarbon stream and hydrocarbons from the pyrolyzed stream in the catalytic cracking zone and providing a cracked effluent stream, the cracked effluent stream including char; passing the cracked effluent stream to a separation zone configured to provide at least one hydrocarbon stream including the char; recovering the char from the at least one hydrocarbon stream in a recovery zone to provide a recovered char; and, utilizing the recovered char to provide energy to the catalytic cracking zone.

In various embodiments of the present invention, the energy provided by the recovered char is heat. It is contemplated that the heat is provided by a boiler associated with the catalytic cracking zone. It is further contemplated that the heat is provided by a fired heater associated with the catalytic cracking zone. It is still further contemplated that the heat is provided by injection of the char via a distributor in a regenerator associated with the catalytic cracking zone.

In at least one embodiment of the present invention, the process includes drying the recovered char to provide a dried char, passing the dried char to at least one combustion zone associated with the catalytic cracking zone, and burning the dried char in the at least one combustion zone associated with the catalytic cracking zone.

In at least one embodiment of the present invention, the process includes mixing the recovered char with a hydrocarbon liquid to provide a slurry fuel, passing the slurry fuel to at least one combustion zone associated with the catalytic cracking zone, and burning the slurry fuel in the at least one combustion zone associated with the catalytic cracking zone.

In at least one embodiment of the present invention, the recovery zone includes a slurry settler.

In at least one embodiment of the present invention, the recovery zone includes a filtration zone.

In at least one embodiment of the present invention, the process includes a pyrolysis stream comprising pyrolysis oil.

In at least one embodiment of the present invention, the separation zone comprises a separation column configured to provide at least one liquid hydrocarbon stream and at least one gaseous hydrocarbon stream. Additionally, wherein a liquid hydrocarbon stream provided by the separation column comprises the hydrocarbon stream including the char.

In at least one embodiment of the present invention, the process includes combusting the recovered char.

In a third aspect of the present invention, the present invention may be broadly characterized as providing a process for reducing greenhouse gas emissions in a catalytic cracking zone by: passing a hydrocarbon stream to a catalytic cracking zone; passing a pyrolyzed stream to the catalytic cracking zone; cracking hydrocarbons from the hydrocarbon stream and hydrocarbons from the pyrolyzed stream in the catalytic cracking zone and providing a cracked effluent stream, the cracked effluent stream including a char; recovering the char in a recovery zone configured to provide a recovered char; and, combusting the recovered char in at least one combustion zone associated with the catalytic cracking zone.

Additional aspects, embodiments, and details of the invention, all of which may be combinable in any manner, are set forth in the following detailed description of the invention.

BRIEF DESCRIPTION OF THE DRAWING

One or more exemplary embodiments of the present invention will be described below in conjunction with the following drawing FIGURE, in which:

The FIGURE shows an apparatus and process flow diagram according to one or more embodiments of the present invention.

DETAILED DESCRIPTION OF THE INVENTION

As mentioned above, processes and apparatuses have been invented in which the char generated in the catalytic cracking zone is recovered and utilized to provide energy, such as heat to the catalytic cracking zone. For example, the char can be mixed with a liquid fuel which can be burned, or the char may be dried to be burned. The char can be recovered with a slurry settler or a filtration zone having a filter.

With these general principles in mind, one or more embodiments of the present invention will be described with the understanding that the following description is not intended to be limiting.

In accordance with an exemplary embodiment, the FIGURE illustrates an exemplary apparatus 10 that may be utilized in accordance with various embodiments of the present invention. In the FIGURE, a biomass 12 is fed into a pyrolysis zone 14 having, for example, a pyrolysis reactor 16. Virtually any form of biomass can be used for pyrolysis. The biomass material may comprise wood, agricultural waste, nuts and seeds, algae, forestry residues, and the like, and mixtures thereof. The pyrolysis may be any of the different modes of pyrolysis, such as, for example, fast pyrolysis, vacuum pyrolysis, catalytic pyrolysis, and slow pyrolysis or carbonization, and the like.

The pyrolysis reactor 16 also receives a heated stream of heat transfer media 18 (for example sand) and a lift gas stream 19, preferably at a temperature between about 480 to about 580° C. (about 896 to 1076° F.), or between about 490 to about 520° C. (about 914 to 968° F.). As will be discussed below, the light gas stream 19 may comprise, for example, a portion of the cracked effluent.

Upon contact with the heated heat transfer media 18 and the lift gas stream 19, the biomass 12 is largely vaporized, resulting in a stream 20 of sand/char and pyrolysis effluent. A separation zone 22, having for example a cyclonic separator or a hot gas filtration unit, separates the stream 20 of sand/char and pyrolysis effluent into a solid stream 24, comprised of sand and a char and a pyrolysis effluent stream 26.

Briefly, the solid stream 24 may be fed to a re-heater 28. An air stream 30 may be compressed and also delivered to the re-heater 28. The introduction of oxygen from the air stream 30 causes ignition and combustion of the char contained in the solids stream 24 therein—which in turn also heats the heat transfer media to the necessary temperatures for the pyrolysis reactor 16. The hot heat transfer media maybe then delivered back to the pyrolysis reactor 16 as the heated heat transfer media 18. The re-heater 28 also provides a flue gas stream 32 which may be passed to a flue gas treatment zone 33 to remove certain contaminants before the flue gas can be vented.

Returning to the separation zone 22, the pyrolysis effluent stream 26 is passed to a catalytic cracking zone 34. In some embodiments the pyrolysis effluent stream 26 is first condensed into a liquid pyrolysis oil stream 25 (also known as pyrolysis oil) and the liquid pyrolysis oil stream 25 may be passed into the catalytic cracking zone 34. For example, the pyrolysis effluent stream 26 may be passed to a condenser 31 which provides the liquid pyrolysis oil stream 25 and a gaseous pyrolysis effluent 27. The liquid pyrolysis oil stream 25 may be passed, via a pump, to the catalytic cracking zone 34. A portion of the liquid pyrolysis oil stream 25 may also be passed to a cooler 29 and then returned to the condenser 31. This is merely preferred.

The pyrolysis effluent stream 26 or the liquid pyrolysis oil stream 25 may be injected into a reactor 42 in the catalytic cracking zone 34. The reactor 42 will also receive a hydrocarbon stream 44. As referred to herein, "hydrocarbon stream" refers to a petroleum-based source of hydrocarbons. The hydrocarbon stream 44 is provided separate from the pyrolysis effluent stream 26, with the pyrolysis effluent stream 26 and hydrocarbon stream 44 separately introduced into the reactor 42 as described in further detail below. The hydrocarbon stream 44 can include a fresh stream of hydrocarbons, or can include a refined stream of hydrocarbons from other refining operations. In an embodiment, hydrocarbon stream 44 is vacuum gas oil, which is a common hydrocarbon stream 44 that is upgraded in catalytic cracking zones. It is to be appreciated that the hydrocarbon stream 44 may be provided from any source, and the processes described herein are not limited to providing the hydrocarbon stream 44 from any particular source.

Furthermore, the reactor 42 receives a stream of particulate cracking catalyst 46. The particulate cracking catalyst 46 is generally introduced into the reactor 42 at a temperature that is sufficient to facilitate catalytic cracking of the mixture of the pyrolysis effluent stream 26 and the hydrocarbon stream 44, catalytic cracking generally commences when the particulate cracking catalyst 46 is comingled with the hydrocarbon stream 44 and/or the pyrolysis effluent stream 26 or the liquid pyrolysis oil stream 25.

The reactor 42 preferably also receives a lift gas stream 48 which will carry the particulate cracking catalyst 46 upward in the reactor 42 into contact with the hydrocarbon stream 44 and/or the pyrolysis effluent stream 26. In some embodiments, the lift gas 48 comprises a portion of the cracked effluent. It is further contemplated that steam is used as the lift gas 48.

In some cases, the pyrolysis effluent stream 26 is injected into the reactor 42 at a position that is higher compared to the position where the hydrocarbon stream 44 is injected into the reactor 42. However, it is also contemplated that the pyrolysis effluent stream 26 is injected into the reactor 42 below the position where the hydrocarbon stream 44 is injected. As is known, distributor rings, nozzles and other means may be utilized to inject the various streams into the reactor 42.

Generally, catalytically cracking of the pyrolysis effluent stream 26 or the liquid pyrolysis oil stream 25 and the hydrocarbon stream 44 includes comingling the particulate cracking catalyst 46 and the pyrolysis effluent stream 26 or the liquid pyrolysis oil stream 25 and/or the hydrocarbon stream 44 in the reactor 42. The catalytic cracking produces an effluent that includes spent particulate cracking catalyst 52 and a gaseous component 54. The gaseous component 54 includes products from the reaction in the reactor 42 such as cracked hydrocarbons, and the cracked hydrocarbons may be condensed to obtain upgraded fuel products that have a range of boiling points. Examples of upgraded fuel products include, but are not limited to, propane, butane, naphtha, light cycle oil, and heavy fuel oil. As mentioned above, the catalytic cracking of the pyrolysis stream 26 also produces char.

In accordance with an embodiment, the spent particulate cracking catalyst 52 and the gaseous component 54 with, for example, a solids-vapor separation device 56, usually one or more cyclones, which is normally located within and at the top of the reactor 42. Typically, the gaseous component 54 includes some of the char produced in the reactor 42.

In an embodiment, the spent particulate cracking catalyst 52 is passed to a stripper 58 that assists with removing deposited compounds from the spent particulate cracking catalyst 52 prior to further catalyst regeneration. From the stripper 58, the spent particulate cracking catalyst 52 is passed to a regenerator 60, where coke is combusted on the catalyst to provide a regenerated catalyst 62 which may be passed back to the catalytic cracking zone 34 as the stream of catalyst 46. The regenerator 60 also produces a flue gas stream 64 which may be passed to the flue gas treatment zone 33.

Returning to the solids-vapor separation device 56, the gaseous component 54 of the effluent may be passed to a product separation zone 66. In an embodiment, the product separation zone 66 includes at least one fractionation zone 68, which can include one or more fractionation columns (not shown) like a stripper column and a debutanizer column, and which produces various liquid product streams 70a, 70b. Another liquid stream 72 can be passed from the fractionation zone 68 to a concentration zone 74 which produces another liquid product stream 70c, typically a naphtha stream. An overhead gaseous stream 76 from the fractionation zone 68 can be passed to a compression zone 78, which compresses the components of the overhead gaseous stream 76. A compressed stream 80 of hydrocarbon components can be passed from the compression zone 78 to the concentration zone 74. Another liquid product stream 82a from the concentration zone 74 typically comprises an LPG stream, while a compressed gas stream 82b from the concentration zone 74 may be used as the lift gas 19 for the pyrolysis zone 14, or the lift gas 48 for the catalytic cracking zone 34.

A heavy hydrocarbon stream 84, for example one taken from a bottom of a fractionation column in the fractionation zone 68, is passed to a char recovery zone 86. In the char recovery zone 86, a filtration zone having a filter, such as a slurry filter can be utilized to remove solids, including the char, from the liquid heavy hydrocarbon stream 84. A liquid portion 88 of the heavy hydrocarbon stream 84 may be recycled to the catalytic cracking zone 34 (for example by being combined with the hydrocarbon stream 44). A char product 90 is recovered from the char recovery zone 86. Since char is combustible, in the various embodiments of the present invention, the char may be used to provide energy, preferably heat energy, to the catalytic cracking zone 34.

For example, the recovered char 90 may be mixed with a liquid fuel such as ethanol or even pyrolysis oil to provide a slurry fuel, and the slurry fuel may be burned. The recovered char 90 may be dried and the dried char may be burned. Other processes for utilizing the char to provide heat may be practice in accordance with the present invention.

In some embodiments, the recovered char 90 (dried, slurry or otherwise) may burned in a boiler or fired heater, such as one associated with the catalytic cracking zone 34. For example, the recovered char 90 (dried, slurry or otherwise) may be sprayed or injected via a distributor into a burner. The recovered char 90 may be used in a fired heater, in a boiler, in a steam generator, or another fired heater. In general, any combustion zone, or area that burns fuel to provide heat, could potentially be utilized to provide heat from the char to the catalytic cracking zone 34 to lower the energy requirements of same.

In addition to lowering the energy consumption, the use of the char will lower the greenhouse gas emissions of the catalytic cracking zone 34 because the recovered char 90, or fuel source, is derived, like the pyrolysis effluent, from a renewable resource. The ability to lower the energy costs, as well as lower the greenhouse gas emissions, are both independently beneficial for refiners.

It should be appreciated and understood by those of ordinary skill in the art that various other components such as valves, pumps, filters, coolers, etc. were not shown in the drawing as it is believed that the specifics of same are well within the knowledge of those of ordinary skill in the art and a description of same is not necessary for practicing or understanding the embodiments of the present invention.

SPECIFIC EMBODIMENTS

While the following is described in conjunction with specific embodiments, it will be understood that this description is intended to illustrate and not limit the scope of the preceding description and the appended claims.

A first embodiment of the invention is a process for recovering energy in a catalytic cracking zone, the process comprising generating char in a catalytic cracking zone, the catalytic cracking zone configured to receive at least a hydrocarbon stream and a pyrolyzed product and provide a cracked effluent, wherein the cracked effluent includes char; separating the char from hydrocarbons in the cracked effluent to provide a recovered char; and, recovering energy from the recovered char. An embodiment of the invention is one, any or all of prior embodiments in this paragraph up through the first embodiment in this paragraph, wherein the recovered char provides energy to the catalytic cracking zone by heating. An embodiment of the invention is one, any or all of prior embodiments in this paragraph up through the first embodiment in this paragraph further comprising mixing the recovered char with a liquid fuel to provide a slurry fuel; and, burning the slurry fuel. An embodiment of the invention is one, any or all of prior embodiments in this paragraph up through the first embodiment in this paragraph further comprising drying the recovered char to provide a dried char; and, burning the dried char. An embodiment of the invention is one, any or all of prior embodiments in this paragraph up through the first embodiment in this paragraph wherein the char is separated from hydrocarbons in the cracked effluent in a char recovery zone. An embodiment of the invention is one, any or all of prior embodiments in this paragraph up through the first embodiment in this paragraph wherein the char recovery zone includes a filtration zone. An embodiment of the invention is one, any or all of prior embodiments in this paragraph up through the first embodiment in this paragraph wherein the filtration zone includes a slurry filter.

A second embodiment of the invention is a process for reducing greenhouse gas emissions in a catalytic cracking zone, the process comprising passing a hydrocarbon stream to a catalytic cracking zone; passing a pyrolyzed stream to the catalytic cracking zone; cracking hydrocarbons from the hydrocarbon stream and hydrocarbons from the pyrolyzed stream in the catalytic cracking zone and providing a cracked effluent stream, the cracked effluent stream including char; passing the cracked effluent stream to a separation zone configured to provide at least one hydrocarbon stream including the char; recovering the char from the at least one hydrocarbon stream in a recovery zone to provide a recovered char; and, utilizing the recovered char to provide energy to a combustion zone. An embodiment of the invention is one, any or all of prior embodiments in this paragraph up through the second embodiment in this paragraph wherein the energy provided by the recovered char is heat. An embodiment of the invention is one, any or all of prior embodiments in this paragraph up through the second embodiment in this paragraph, wherein the heat is provided by a boiler associated with the catalytic cracking zone. An embodiment of the invention is one, any or all of prior embodiments in this paragraph up through the second embodiment in this paragraph, wherein the heat is provided by a fired heater associated with the catalytic cracking zone. An embodiment of the invention is one, any or all of prior embodiments in this paragraph up through the second embodiment in this paragraph, wherein the heat is provided by injection of the char via a distributor in a regenerator associated with the catalytic cracking zone. An embodiment of the invention is one, any or all of prior embodiments in this paragraph up through the second embodiment in this paragraph further comprising drying the recovered char to provide a dried char; passing the dried char to at least one combustion zone associated with the catalytic cracking zone; and, burning the dried char in the at least one combustion zone associated with the catalytic cracking zone. An embodiment of the invention is one, any or all of prior embodiments in this paragraph up through the second embodiment in this paragraph further comprising mixing the recovered char with a liquid fuel to provide a slurry fuel; passing the slurry fuel to at least one combustion zone associated with the catalytic cracking zone; and, burning the slurry fuel in the at least one combustion zone associated with the catalytic cracking zone. An embodiment of the invention is one, any or all of prior embodiments in this paragraph up through the second embodiment in this paragraph wherein the recovery zone includes a filtration zone. An embodiment of the invention is one, any or all of prior embodiments in this paragraph up through the second embodiment in this paragraph wherein the filtration zone includes a slurry filter. An embodiment of the invention is one, any or all of prior embodiments in this paragraph up through the second embodiment in this paragraph wherein the pyrolysis stream comprises pyrolysis oil. An embodiment of the invention is one, any or all of prior embodiments in this paragraph up through the second embodiment in this paragraph wherein the separation zone comprises a separation column configured to provide at least one liquid hydrocarbon stream and at least one gaseous hydrocarbon stream, and wherein a liquid hydrocarbon stream provided by the separation column comprises the hydrocarbon stream including the char. An embodiment of the invention is one, any or all of prior embodiments in this paragraph up through the second embodiment in this paragraph further comprising combusting the recovered char.

A third embodiment of the invention is a process for reducing greenhouse gas emissions in a catalytic cracking zone, the process comprising passing a hydrocarbon stream to a catalytic cracking zone; passing a pyrolyzed product to the catalytic cracking zone; cracking hydrocarbons from the hydrocarbon stream and hydrocarbons from the pyrolyzed product in the catalytic cracking zone and providing a cracked effluent stream, the cracked effluent stream including a char; recovering the char in a recovery zone configured to provide a recovered char; and, combusting the recovered char in at least one combustion zone.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A process for recovering energy in a fluid catalytic cracking zone, the process comprising:
   generating char in a fluid catalytic cracking zone, the fluid catalytic cracking zone configured to receive at least a hydrocarbon stream and a pyrolyzed product and provide a cracked effluent, wherein the cracked effluent includes char;
   separating the char from hydrocarbons in the cracked effluent to provide a recovered char; and
   recovering energy from the recovered char.

2. The process of claim 1, wherein the recovered char provides energy to the catalytic cracking zone by heating.

3. The process of claim 1 further comprising:
   mixing the recovered char with a liquid fuel to provide a slurry fuel; and
   burning the slurry fuel.

4. The process of claim 1 further comprising:
   drying the recovered char to provide a dried char; and
   burning the dried char.

5. The process of claim 1 wherein the char is separated from hydrocarbons in the cracked effluent in a char recovery zone.

6. The process of claim 5 wherein the char recovery zone includes a filtration zone.

7. The process of claim 6 wherein the filtration zone includes a slurry filter.

8. A process for recovering energy in a catalytic cracking zone, the process comprising:
   generating char in a catalytic cracking zone, the catalytic cracking zone configured to receive at least a petroleum-based hydrocarbon stream and a pyrolyzed product and provide a cracked effluent, wherein the cracked effluent includes char;
   separating the char from hydrocarbons in the cracked effluent to provide a recovered char; and
   recovering energy from the recovered char.

9. The process of claim 8, wherein the recovered char provides energy to the catalytic cracking zone by heating.

10. The process of claim 8 further comprising:
    mixing the recovered char with a liquid fuel to provide a slurry fuel; and
    burning the slurry fuel.

11. The process of claim 8 further comprising:
    drying the recovered char to provide a dried char; and
    burning the dried char.

12. The process of claim 8 wherein the char is separated from hydrocarbons in the cracked effluent in a char recovery zone.

13. The process of claim 12 wherein the char recovery zone includes a filtration zone.

14. The process of claim 13 wherein the filtration zone includes a slurry filter.

* * * * *